UNITED STATES PATENT OFFICE.

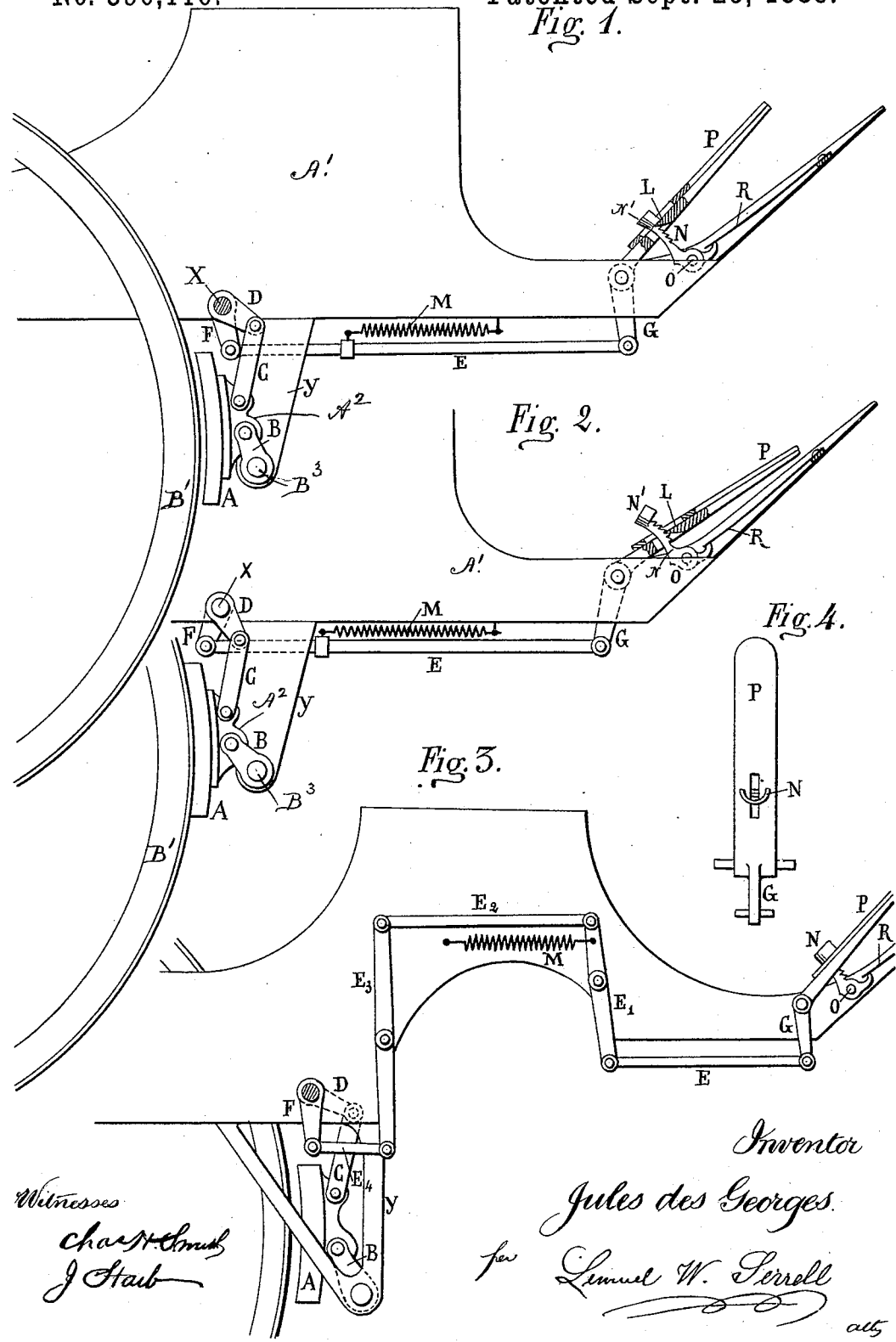

JULES DES GEORGES, OF PARIS, FRANCE.

BRAKE FOR VEHICLES.

SPECIFICATION forming part of Letters Patent No. 390,116, dated September 25, 1888.

Application filed April 30, 1888. Serial No. 272,238. (No model.) Patented in France March 3, 1888, No. 189,325; in England April 6, 1888, No. 5,150, and in Belgium May 7, 1888, No. 81,729.

*To all whom it may concern:*

Be it known that I, JULES DES GEORGES, of Paris, France, have invented an Improvement in Brakes for Vehicles, of which the following is a specification.

Letters Patent for this invention have been granted to me in Great Britain, April 6, 1888, No. 5,150; in France, March 3, 1888, No. 189,325, and in Belgium May 7, 1888, No. 81,729.

The object of my invention is to provide a brake that can be applied quickly and with slight exertion of force by the driver of the vehicle. I accomplish this result by supporting the brake by a rock-shaft, toggle, and crank-arms so arranged that after the brake has been brought into contact with the wheel the resulting friction causes the wheel to move the brake, thereby straightening out the toggle-arms and bringing the brake with great pressure against the wheel.

In the drawings, Figure 1 is an elevation, partially in section, of my brake mechanism. A portion of the vehicle is represented and the brake is shown as away from the wheel. Fig. 2 is a similar view with the brake applied to the wheel. Fig. 3 represents a modification of the means for operating the rock-shaft of the brake, and Fig. 4 is a plan view of the foot-lever detached.

A' represents a portion of the body of the vehicle, and B' a part of one of the fore wheels.

X is a shaft supported in suitable bearings upon the body A', and F is a crank-arm firmly secured to said shaft.

E is a link connected at one end to the crank F and at the other end to a lever, G, pivoted upon the body of the vehicle, and this lever is provided with a foot-piece, P, for the driver to place his foot upon when operating the brake.

$A^2$ is the brake-block, and A the shoe thereof.

D is a crank-arm firmly secured to the shaft X, and C is a link connecting the brake-block with said arm D.

B is a crank-arm connected to the brake-block, and said arm is pivoted at $B^3$ to a support, Y, attached to the body of the vehicle.

It is now to be understood that when the brake is to be applied the driver presses his foot upon the foot-piece P of the lever G, and said lever, through the link E and arm F, turns the rock-shaft X. The rock-shaft in turning swings the arm D, and by the link C brings the brake in contact with the wheel. The friction of the brake against the wheel causes the wheel to carry down still farther the brake, thereby bringing the arm D and link C nearer into line with each other and causing the arm B to assume a more horizontal position, as shown in Fig. 2, and the toggle action of the parts causes the brake to be applied with great pressure to the wheel as the brake is moved down by the friction of the wheel and brake against each other.

I provide a latch, N, pivoted at O, to keep the lever G in the position to which it may be moved by the driver. One end of this latch passes through a mortise in the foot-piece P, and said end has a heel-piece, N', and a notched front edge. A spring, R, acts against the other end of said latch N and forces the notched edge of said latch against a tooth, L, formed by the beveled front edge of said mortise, so that said tooth enters one of the notches in the latch, and the latch thereby holds the lever G in the position to which it may be moved. When it is desired to take off the brake, the driver presses his foot against the heel-piece N', which disconnects N from G, and the spring M returns the parts from the position of Fig. 2 to that of Fig. 1.

In Figs. 1 and 2 I have shown the spring M as connected at one end to the body of the vehicle and at its other end to the link E. In the modification shown in Fig. 3 and next described said spring is shown as connected at one end to the body of the vehicle and at the other end to the lever E'. In either case the brake is applied against the action of said spring, and when the foot-piece P is released said spring M returns the parts to their normal position with the brake off the wheel.

It is preferable that the shaft X extend from side to side of the vehicle, so that a brake may be applied to each fore wheel of the vehicle and both brakes be operated simultaneously by the one shaft.

This brake can be applied to all kinds of wheeled vehicles, and the connections may be so arranged that the brake may be operated by a hand-lever or by a wheel and chain.

Instead of having the link E act directly upon the arm F, as in Figs. 1 and 2, there may be intermediate levers and links, E' E² E³ E⁴, as shown in Fig. 3.

The link E may be in two parts and connected by a coupling, so that said link may be lengthened or shortened to adjust the angular position of the arms F D and link C, and also to compensate for wear of the shoe A.

I claim as my invention—

1. The combination, with the rock-shaft X and arms F and D, secured thereto, of the brake-block A, a link, C, connecting the same to the arm D, the arm B, pivoted to a fixed support, and also pivoted to said brake-block, and means, substantially as specified, for turning the shaft X and applying the brake.

2. The combination, with the rock-shaft X and arms F and D, secured thereto, of the brake-block A, link C, connecting the same to the arm D, the arm B, pivoted to a fixed support, and also pivoted to said brake-block, the lever G, link E, and spring M, substantially as and for the purposes specified.

3. The combination, with the rock-shaft X, arms D, F, and B, link C, brake A, the link E, and lever G, of the notched latch N, passing through a mortise in the lever G, a tooth upon the lever G, and a spring, R, to keep the notched edge of the latch in contact with said tooth, substantially as specified.

The foregoing specification of my improvement in instantaneous brakes signed by me this 9th April, 1888.

JULES DES GEORGES.

Witnesses:
L. GUYOT,
GABEUR.